(12) United States Patent
Nguyen et al.

(10) Patent No.: US 9,053,093 B1
(45) Date of Patent: Jun. 9, 2015

(54) MODULAR DIRECT MEMORY ACCESS SYSTEM

(71) Applicant: ALTERA CORPORATION, San Jose, CA (US)

(72) Inventors: Harry Nguyen, Campbell, CA (US); Christopher D. Finan, Cupertino, CA (US); Philippe Molson, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/974,682

(22) Filed: Aug. 23, 2013

(51) Int. Cl.
*G06F 9/30* (2006.01)
*G06F 12/10* (2006.01)
*G06F 13/28* (2006.01)

(52) U.S. Cl.
CPC ............ *G06F 13/28* (2013.01); *G06F 9/30192* (2013.01); *G06F 12/1081* (2013.01); *G06F 2213/2802* (2013.01)

(58) Field of Classification Search
None
See application file for complete search history.

(56) References Cited

U.S. PATENT DOCUMENTS

| 4,831,523 | A | 5/1989 | Lewis et al. |
| 5,056,010 | A | 10/1991 | Huang |
| 5,212,795 | A | 5/1993 | Hendry |
| 5,333,290 | A | 7/1994 | Kato |
| 5,588,112 | A | 12/1996 | Dearth et al. |
| 6,728,797 | B2 | 4/2004 | Miura |
| 6,775,716 | B2 | 8/2004 | Tojima |
| 6,792,481 | B2 | 9/2004 | Hoang et al. |
| 8,108,571 | B1 | 1/2012 | Bouvier |
| 8,176,221 | B2 | 5/2012 | Nagai et al. |
| 8,266,340 | B2 | 9/2012 | Nagai et al. |
| 2009/0070513 | A1* | 3/2009 | Ganapathy et al. ........... 710/308 |
| 2011/0307759 | A1* | 12/2011 | Go et al. ........................ 714/758 |

OTHER PUBLICATIONS

Altera Corporation, DMA Controller Core, Nov. 2008, pp. 1-10, Quartus II Handbook Version 9.1, vol. 5: Embedded Peripherals.

* cited by examiner

*Primary Examiner* — Kris Rhu
(74) *Attorney, Agent, or Firm* — Okamoto & Benedicto LLP

(57) ABSTRACT

One embodiment relates to an integrated circuit with a modular direct memory access system. A read data mover receives data obtained from a source address, and a write data mover for sends the data to a destination address. A descriptor controller provides the source address to the read data mover and the destination address to the write data mover. Another embodiment relates to a method of providing direct memory access. Another embodiment relates to a system which provides direct memory access. Other embodiments and features are also disclosed.

21 Claims, 5 Drawing Sheets

MODULAR DIRECT MEMORY ACCESS SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Technical Field

The present invention relates generally to integrated circuits and digital electronics. More particularly, the present invention relates to apparatus and methods for direct memory access.

2. Description of the Background Art

Digital electronics and computing systems often include a direct memory access (DMA) capability. DMA generally allows certain hardware subsystems to move data independently of a central processing unit (CPU).

SUMMARY

One embodiment relates to an integrated circuit with a modular direct memory access system. A read data mover receives data obtained from an original source address and stores it at an end-point destination address in local memory, and a write data mover obtains the data from the end-point address in local memory and sends the data to a final destination address. A descriptor controller may direct the operations of the read and write data movers using read and write descriptors.

Another embodiment relates to a method of providing a direct memory access transfer using an integrated circuit. A descriptor is obtained by a descriptor controller. The descriptor includes at least an original source address for the DMA transfer, a final destination address for the DMA transfer, and a data length. Data is read by a read data mover starting at the original source address, and the data is written by the read data mover to an end-point address in local memory on the integrated circuit. In addition, the data is read by a write data mover from the end-point address in the local memory, and the data is written by the write data mover to the final destination address.

Another embodiment relates to a system which provides direct memory access. The system includes a root complex, an integrated circuit with DMA circuit modules, and a data link communicatively interconnecting the root complex and the integrated circuit. The root complex includes a central processing unit, main memory, and a root port communicatively connected to the main memory and the central processing unit. The DMA circuit modules on the integrated circuit includes a read data mover for receiving data obtained from an original source address, a write data mover for sending the data to a final destination address, and a descriptor controller for providing DMA information to the data movers.

Other embodiments and features are also disclosed herein.

DETAILED DESCRIPTION

A conventional DMA system has a fixed programming model architecture where registers used for the DMA sequential operation are tightly coupled with the main data path logic. This monolithic architecture offers poor scalability to efficiently address different models, such as a ring of descriptor lists, linked lists, descriptor fetcher locations, and descriptor format tables.

The present disclosure overcomes these issues by providing a modular architecture for a DMA system. In this architecture, the architecture partitions the DMA system into two separate modules: a DMA main module (which may also be referred to as simply the "DMA module"); and a descriptor control module (descriptor controller). The DMA main module includes DMA read and write data mover modules (DMA read and write data movers) that handle the intensive data transfer between source and destination and may be highly optimized for a particular protocol, such as the PCI Express® (PCIe) protocol, for example. The descriptor control module may be protocol agnostic and interchangeable to comply with different programming models, such as different descriptor format tables, or linked lists versus linear lists.

Modular DMA System

Figure 1:
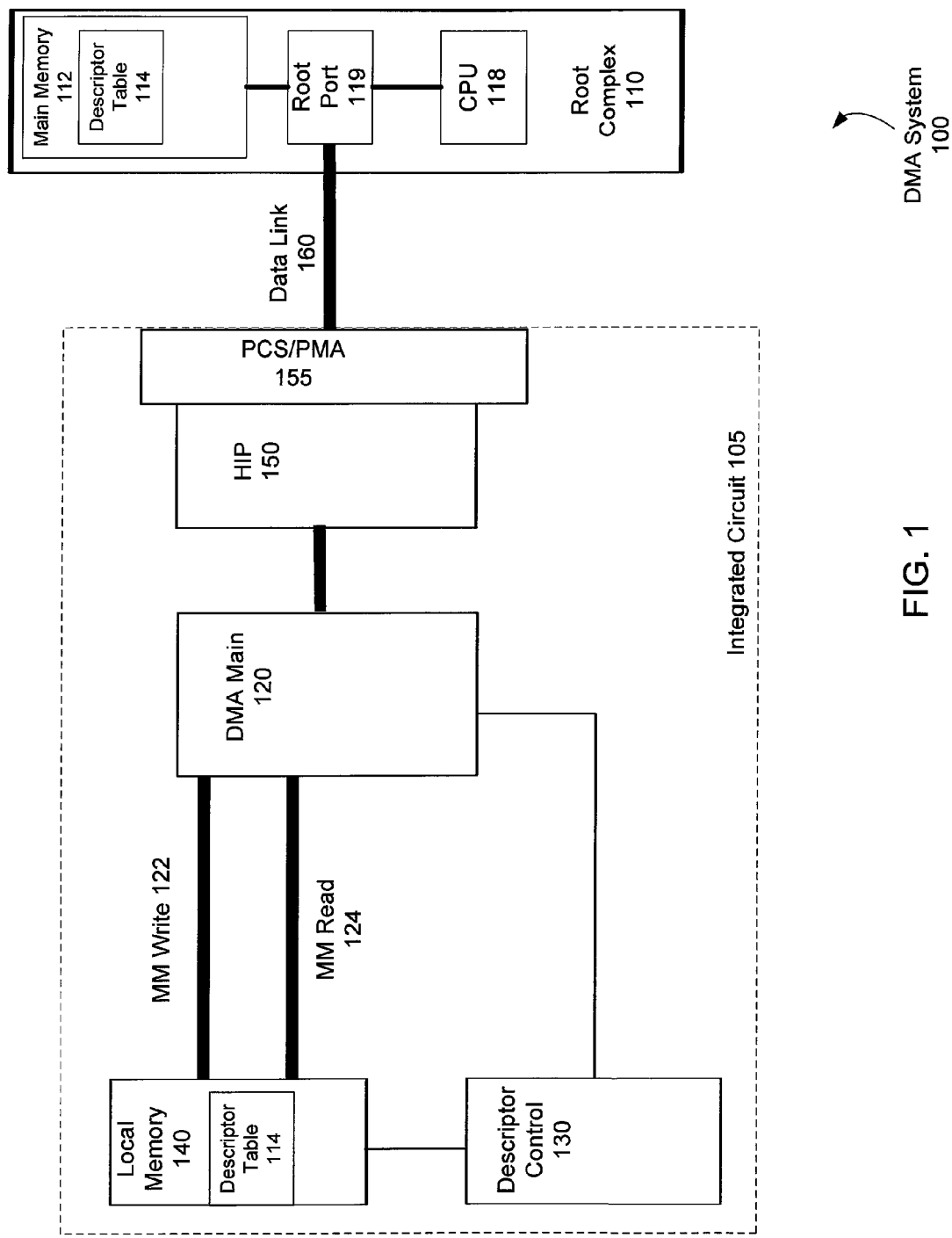
FIG. 1 is a diagram of a modular direct memory access system in accordance with an embodiment of the invention.

FIG. 1 is a diagram of a modular direct memory access system in accordance with an embodiment of the invention. As depicted, the DMA system 100 may include a root complex 110 communicatively connected by a data link 160 to an integrated circuit 105. In one implementation, the data link 160 may be a PCI Express® data link. Other types of data links may be used in other implementations.

The root complex 110 may include a root port 119, main memory 112 and a CPU 118. The root port 119 may connect to the data link 160 for communicating data with the integrated circuit 105. The CPU 118 and the main memory 112 also communicatively interconnect to the root port 119. The CPU 118 may execute instruction code and so process data. The main memory 112 may hold a descriptor table 114 and data 116.

The integrated circuit 105 includes various modules used by the DMA system. As depicted, the modules on the integrated circuit 105 may include a hard-wired interface protocol (HIP) module 150, a DMA main module (which may be also referred to as the "DMA module" or simply the "DMA") 120, and a descriptor control module (also referred to as the "descriptor controller") 130. The integrated circuit 105 may also include local memory 140 and Physical Coding Sublayer and Physical Media Attachment (PCS/PMA) circuitry 155. The local memory 140 is on-chip memory and may hold copies of descriptor tables 142 and data 144. The DMA main module 120 may be connected to the local memory 140 by way of a memory-mapped (MM) write interface 122 and a MM read interface 124.

Figure 2:
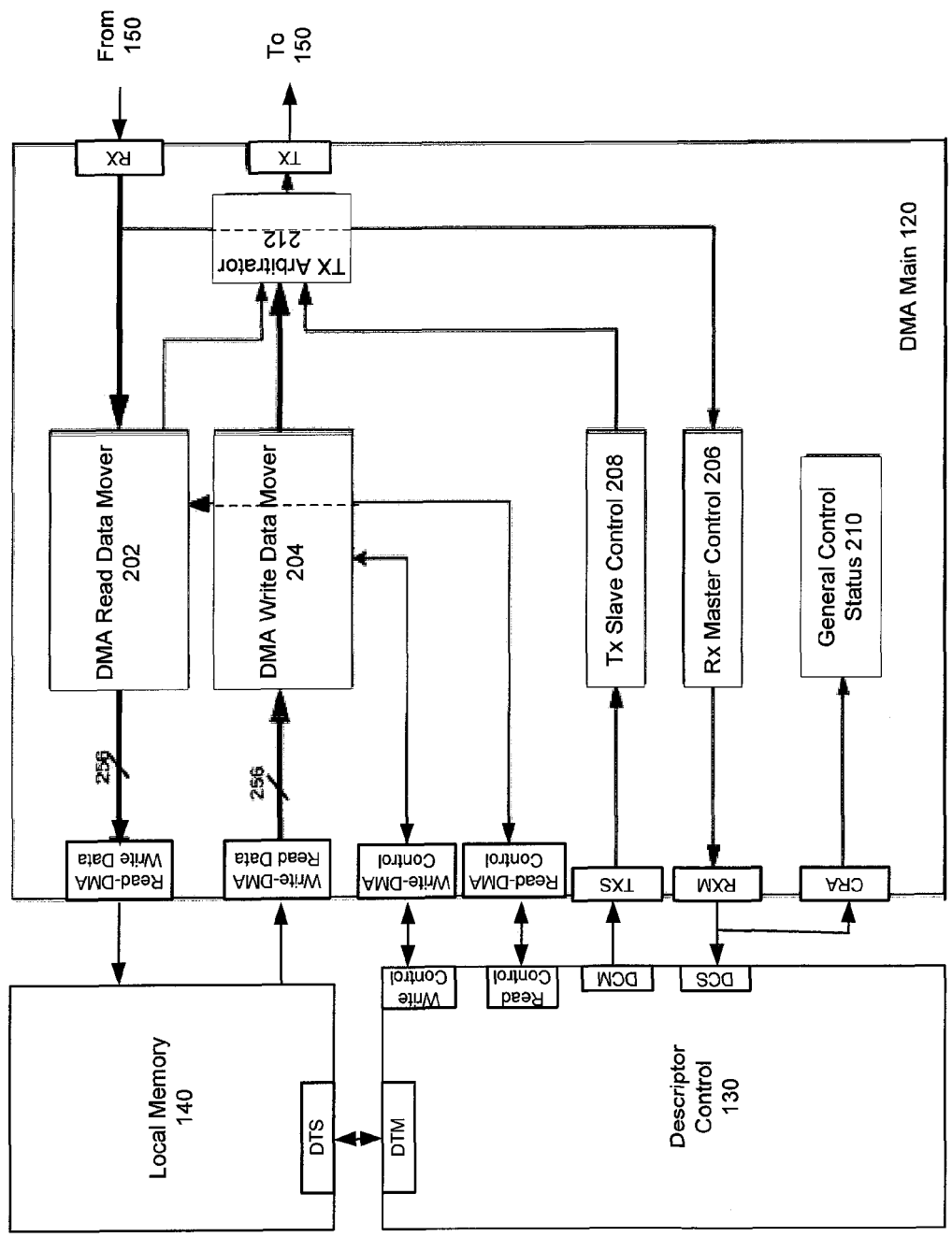
FIG. 2 depicts the DMA main module, descriptor control module and local memory and their interfaces in accordance with an embodiment of the invention.

FIG. 2 depicts the DMA main module 120, descriptor control module 130 and local memory 140 and their interfaces in accordance with an embodiment of the invention. Also depicted in FIG. 2 are various modules within the DMA main module 120.

The DMA main module 120 may include memory-mapped (MM) ports. The memory-mapped ports may include DMA data ports that connect to the local memory 140 and DMA service and control register access (CRA) ports that connect to the descriptor control module 130. The DMA data ports connecting from the DMA main module 120 to the local memory 140 may include a Read-DMA write data master port (Read-DMA Write Data) and a Write-DMA read data master port (Write-DMA Read Data). The DMA service ports connecting from the DMA main module 120 to the descriptor controller 130 may include a receive master (RXM) port, a transmit slave (TXS) port.

Exemplary parameters for these memory-mapped ports are given below in Table 1. Other port parameters may be used in other implementations.

TABLE 1

Exemplary Parameters for Memory-Mapped Ports

| Port Name | Data Width | Burst Count | Byte Enable | Wait Request |
|---|---|---|---|---|
| RXM (Master) | 32 | No | 4 | Yes |
| TXS (Slave) | 32 | No | 4 | Yes |
| CRA (Slave) | 32 | No | 4 | Yes |
| Read-DMA Write Data (Master) | 256 | 5 | 32 | Yes |
| Write-DMA Read Data (Master) | 256 | 5 | 32 | Yes |

As shown above in Table 1, the RXM and TXS ports may be multiple-bit (for example, 32-bit) non-bursting master and slave ports, respectively, and the CRA port may be a multiple-bit (for example, 32-bit) non-bursting slave port. Both the Read-DMA Write Data and Write-DMA Read Data ports may be multiple-bit (for example, 256-bit) bursting master ports with full byte-enable and wait request support. These MM ports may be implemented using, for example, the Avalon®-MM interface available from Altera Corporation of San Jose. Other interfaces may be used in other implementations.

The RXM port may be used as a means for host software executed by the CPU 118 to program various internal registers within the descriptor control module 130 or within the DMA read and write data movers (202 and 204). These registers may include a DMA descriptor table register, DMA control and status registers, and interrupt enable and status registers. The TXS port may be used to send status messages or other messages from the descriptor control module 130 to the root complex 110. The CRA port may be used to access the general control and status registers 210 of the DMA main module 120. The Read-DMA Write Data port may be used to transfer data from the DMA read data mover 202 to the local memory 140, and the Write-DMA Read Data port may be used to transfer data from the local memory 140 to the DMA write data mover 204.

The DMA main module 120 may also include streaming ports. These streaming ports may include instruction/status ports connecting to the descriptor controller 130 and high-speed ports to communicate with the root complex 110 via the data link 160.

The instruction/status ports may include a write DMA control (Write-DMA Control) port and a read DMA control (Read-DMA Control) port. The instruction/status ports may include the Read-DMA Write Data port and the Write-DMA Read Data ports. An exemplary implementation of port parameters for these streaming ports is given below in Table 2. Other port parameters may be used in other implementations.

TABLE 2

Exemplary Parameters for Streaming Ports

| Port Name | Data Width | Valid | Ready | SOP/EOP | Empty |
|---|---|---|---|---|---|
| Read-DMA Control (AST) | 72 | Yes | No | No | No |
| Write-DMA Control (AST) | 32 | Yes | No | No | No |
| Read-DMA Write Data (AST) | 256 | Yes | Yes | Yes | Yes |
| Write-DMA Read Data (AST) | 256 | Yes | Yes | Yes | Yes |

As indicated in Table 2, these ports may be implemented, for example, using the Avalon®-ST (AST) interface available from Altera Corporation of San Jose, Calif. Other interface technologies may be utilized in other implementations.

The Read-DMA Control port may be used to communicate control messages between the descriptor control module 130 and the DMA read data mover 202, and the Write-DMA Control port may be used to communicate control messages between the descriptor control module 130 and the DMA write data mover 204. As mentioned above, the Read-DMA Write Data port may be used to transfer data from the DMA read data mover 202 and the local memory 140, and the Write-DMA Read Data port may be used to transfer data from the local memory 140 to the DMA write data mover 204.

The receive (RX) and transmit (TX) interfaces provide for communications between the DMA main module 120 and the HIP module 150. The RX interface may be used to receive memory write transaction layer packets (TLPs), memory read TLPs and completion TLPs from the root port 119. The TX interface may be used to send memory write TLPs and memory read TLPs to the root port 119.

The receive master control module (RX master control) 206 may be used to propagate control data received via the RX port from the root port 119 downstream via the RXM port to the descriptor controller 130 and, subsequently, to the DMA read and write data movers (202 and 204). This allows software run by the CPU 118 to program the control, status, and descriptor information downstream to a DMA control slave. The RX master control 206 may convert a downstream read or write TLP received via the RX port from the HIP 150 to a memory mapped (MM) request via the RXM port to the descriptor control module 130. An exemplary implementation of the signaling for the RX and RXM interfaces is given below in Table 3. Other signaling schemes may be used in other implementations.

TABLE 3

Exemplary Signaling for RX and RXM interfaces

| Interface | Signal Name | I/O | Description |
|---|---|---|---|
| RX (AST) | RxStSop_i | Input | Rx SOP |
| | RxStEop_i | Input | RX EOP |
| | RXStData_i[255:0] | Input | Avalon ®-Streaming Data |
| | RxStReady_o | Output | Rx ready |
| | RxStValid_i | Input | Rx Data Valid |
| | RxStEmpty_i[1:0] | Input | Rx Data Empty bits |

TABLE 3-continued

Exemplary Signaling for RX and RXM interfaces

| Interface | Signal Name | I/O | Description |
|---|---|---|---|
| RXM (MM Master) | RxmRead_o | Output | Rxm Master Read |
| | RxmWrite_o | Output | Rxm Master Write |
| | RxmAddress_o | Output | Rxm Address |
| | RxmData_o[31:0] | Output | Rxm Master write data |
| | RxmByteEnable_o[3:0] | Output | Rxm Master write byte enable |
| | RxmReadData_i[31:0] | Input | Rxm read data |
| | RxmWaitRequest_i | Input | Rxm wait request |

The transmit slave control module (TX slave control) 208 may be used to propagate control data received via the TXS port from the descriptor controller 130 upstream by transmission via the TX port to the root complex 110. This allows a DMA control master to access the interface protocol's memory space. The DMA system 100 may use this path to update the DMA status upstream. The TX slave control 208 may convert a MM read or write request to a TLP for sending upstream. An exemplary implementation of the signaling for the TX and TXS interfaces is given below in Table 4. Other signaling schemes may be used in other implementations.

TABLE 4

Exemplary Signaling for TX and TXS interfaces

| Interface | Signal Name | I/O | Description |
|---|---|---|---|
| TX (AST) | TxStSop_o | Output | Tx SOP |
| | TxStEop_o | Output | TX EOP |
| | TxStData_o[255:0] | Output | Avalon ®-Streaming Data |
| | TxStReady_i | Input | Tx ready |
| | TxStValid_o | Output | Tx Data Valid |
| | TxStEmpty_o[1:0] | Output | Tx Data Empty bits |
| TXS (MM Slave) | TxsRead_i | Input | Tx Slave Read |
| | TxsWrite_i | Input | Txs Write |
| | TxsAddress_i | Input | Txs Address |
| | TxsData_i[31:0] | Input | Txs write data |
| | TxsByteEnable_i[3:0] | Input | Txs write byte enable |
| | TxsReadData_o[31:0] | Output | Txs read data |
| | TxsWaitRequest_o | Output | Txs wait request |

DMA Read Data Mover

The DMA read data mover 202 may be used to move high throughput data downstream. In particular, the DMA read data mover 202 may receive data in the form of memory read TLPs from the HIP module 120 (via the RX port) and write the data to the local memory 140 (via the Read-DMA Write Data port). The Read-DMA Control port may be used to transmit and receive communications between the descriptor control module 130 and the DMA read data mover 202. For example, the descriptor control module 130 uses the Read-DMA Control port to load the descriptor and control information into the DMA read data mover 202. In addition, the DMA read data mover 202 reports DMA status information to the descriptor control module 130 via the Read-DMA Control port.

An exemplary implementation of the signaling for ports of the DMA read data mover 202 is given below in Table 5. Other signaling schemes may be used in other implementations.

TABLE 5

Exemplary Signaling for DMA Read Data Mover

| Interface | Signal Name | I/O | Description |
|---|---|---|---|
| Read-DMA Write Data (MM Master) | RdDmaWrite_o | Output | Write Request |
| | RdDmaAddress_o[31:0] | Output | Write Address |
| | RdDmaWriteData_o[255:0] | Output | Write Data |
| | RdDmaBurstCount_o[4:0] | Output | Burst Count |
| | RdDmaByteEnable_o[31:0] | Output | Write Byte Enable |
| | RdDmaWaitRequest_i | Input | Write Wait Request |
| Read-DMA Control (AST) | RdDdmaRxData_i[159:0] | Input | Control Data |
| | RdDdmaRxValid_i | Input | Control Data Valid |
| | RdDdmaRxReady_o | Output | Control Data Ready |
| | RdDdmaTxData_o[31:0] | Output | Status Data |
| | RdDdmaRxValid_o | Output | Status Data Valid |

An exemplary register definition for a read DMA operation to be performed by the DMA read data mover 202 is given below in Table 6. Other register definitions may be used in other implementations.

TABLE 6

Exemplary Register for Read DMA Data Mover

| Bits | Name | Description |
|---|---|---|
| [31:0] | Source Low Address | Lower 32-bit of PCIe address where the DMA will start to read. Address boundary must align to the 32-bit (2 LSB bits is 2'b00) |
| [63:32] | Source Hi Address | Higher 32-bit of PCIe Address where the DMA will start to read |
| [95:64] | Destination Low Address | Lower 32-bit of Avalon ®-MM address where the DMA will write. Address boundary must align to the 32-bit (2 LSB bits is 2'b00) |
| [127:96] | Destination Hi Address | Higher 32-bit of Avalon ®-MM address where the DMA will write |
| [145:128] | DMA Length | DMA Length measured in DWORDs (up to 1 MB) |
| [153:146] | DMA Descriptor ID | Descriptor ID (0-256) |
| [159:154] | Reserved | |

DMA Write Data Mover

The DMA write data mover 204 may be used to move high throughput data upstream. In particular, the DMA write data mover 204 may read data from the local memory 140 (via the Write-DMA Read Data port) and send the data upstream in the form of memory write TLPs to the HIP module 120 (via the TX port). The Write-DMA Control port may be used to transmit and receive communications between the descriptor control module 130 and the DMA write data mover 204. For example, the descriptor control module 130 uses the Write-DMA Control port to load the descriptor and control information into the DMA write data mover 204. In addition, the DMA write data mover 204 reports DMA status information to the descriptor control module 130 via the Write-DMA Control port.

An exemplary implementation of the signaling for ports of the DMA write data mover 204 is given below in Table 7. Other signaling schemes may be used in other implementations.

TABLE 7

Exemplary Signaling for DMA Write Data Mover

| Interface | Signal Name | I/O | Description |
|---|---|---|---|
| Write-DMA Read | WrDmaRead_o | Output | Read Request |
| | WrDmaAddress_o[31:0] | Output | Read Address |

TABLE 7-continued

Exemplary Signaling for DMA Write Data Mover

| Interface | Signal Name | I/O | Description |
|---|---|---|---|
| Data (MM Master) | WrDmaBurstCount_o[4:0] | Output | Burst Count |
| | WrDmaWaitRequest_i | Input | Wait Request |
| | WrDmaRxValid_i | Input | Read Data Valid |
| | WrDmaReadData_i[255:0] | Input | Read Data |
| Write DMA to HIP fifo interface | WrDmaTxFifoData_o[259:0] | Output | Tx FifoData |
| | WrDmaTxFifoWrReq_o | Output | Tx Fifo Write Request |
| | WrDmaTxFifoCnt_i[31:0] | Input | Tx Fifo Count |
| Write-DMA Control Rx (AST) | WrDmaRxData_i[159:0] | Input | Control Data |
| | WrDmaRxValid_i | Input | Control Valid |
| | WrDmaRxReady_o | Output | Control Ready |
| Write-DMA Control Tx (AST) | WrDmaTxData_o[31:0] | Output | Status Data |
| | WrDmaRxValid_o | Output | Status Valid |

An exemplary register definition for a write DMA operation to be performed by the DMA write data mover 204 is given below in Table 8. Other register definitions may be used in other implementations.

TABLE 8

Exemplary Register for Write DMA Data Mover

| Bits | Name | Description |
|---|---|---|
| [31:0] | Source Low Address | Lower 32-bit of Avalon ®-MM address where the DMA will start to read the write data. Address boundary must align to the 256-bit |
| [63:32] | Source Hi Address | Higher 32-bit of Avalon ®-MM Address where the DMA will start to read the write data |
| [95:64] | Destination Low Address | Lower 32-bit of PCIe address where the DMA will write. Address boundary must align to the 32-bit (2 LSB bits is 2'b00) |
| [127:96] | Destination Hi Address | Higher 32-bit of PCIe address where the DMA will write |
| [145:128] | DMA Length | DMA Length measured in DWORDs (up to 1 MB) |
| [153:146] | DMA Descriptor ID | Descriptor ID (0-255) |
| [159:154] | Reserved | |

Side-Band Control Bits

Side-band control bits may also be used for the DMA Read and Write Data Movers (202 and 204). These bits may be used to provide additional control commands. An exemplary side-band control bit map is given below in Table 9. Other side-band control bit maps may be used in other implementations.

TABLE 9

Exemplary Side-Band Control Bits for DMA

| Bits | Name | Description |
|---|---|---|
| 3 | FLUSH | Flush all pending descriptors and current descriptor. Send status DMA abort with the associated Descriptor ID to the controller. |
| 2 | ABORT | When set to 1, the DMA will stop the transfer, abort the current DMA descriptor, and send status DMA abort with the associated Descriptor ID to the controller. |
| 1 | RESUME | When set to 1, DMA restart to transfer the remaining data after being paused. |
| 0 | PAUSE | When set to 1, the DMA will stop the transfer until this bit is cleared. This bit can be indirectly set by software via the CRA port. |

Status Information for a DMA Operation

The status of each DMA operation may be reported back to the descriptor controller 130 by way of the Read-DMA Control port and/or the Write-DMA Control port once a reporting event is triggered. The reporting event triggers may include the following events: descriptor activated; descriptor is completed successfully; DMA is paused; DMA is continued after a pause; and DMA is aborted. The status information may include the following fields: descriptor ID; descriptor completed; abort; pause; and busy. The status information may be available by way of a status register that software may access via the CRA port.

An exemplary bit mapping for a status register of the DMA is given below in Table 10. Other status register bit maps may be used in other implementations.

TABLE 10

Exemplary Status Register Bit Map for DMA Read Data Mover

| Bits | Name | Description |
|---|---|---|
| [15:13] | Flush Count | The number of descriptors being flushed: pending + current descriptors |
| 12 | Flushed | All descriptors flushed |
| 11 | Aborted | DMA was aborted |
| 10 | Paused | DMA currently halted |
| 9 | Busy | DMA is running |
| 8 | Completed | Descriptor is completed successfully |
| [7:0] | Descriptor ID | Descriptor ID (0-256) |

Read and Write Descriptor Queues

The DMA 120 may have a built-in read and write descriptor queues that are each capable of holding multiple (for example, three) descriptors in order to ensure high DMA throughput. The descriptor control module 130 may be responsible for pushing descriptors into these queues without overflowing them; otherwise, descriptors could be lost or dropped. In one implementation, the status of these descriptor queues may be accessed by way of a DMA Queue Status register, and the descriptor queues may be flushed by way of a DMA Queue Control register.

The DMA Read Data Mover 202 operates based on the read descriptor queue that is setup by the descriptor controller 130. If there is pending descriptor in the read descriptor queue, the control logic of the DMA Read Data Mover 202 may fetch the descriptor from the read descriptor queue and start processing it if a RUN bit is set for that descriptor. If the RUN bit is not set, the DMA Read Data Mover 202 may wait for the RUN bit to be set before starting the DMA read operation for that descriptor. The DMA read operation being currently run may be started, stopped, run, continued or aborted by writing an appropriate bit of a Global Read DMA Control register.

Similarly, the DMA Write Data Mover 204 operates based on the write descriptor queue that is setup by the descriptor controller 130. If there is pending descriptor in the write descriptor queue, the control logic of the DMA Write Data Mover 204 may fetch the descriptor from the write descriptor queue and start processing it if a RUN bit is set for that descriptor. If the RUN bit is not set, the DMA Write Data Mover 204 may wait for the RUN bit to be set before starting the DMA write operation for that descriptor. The DMA write operation being currently run may be started, stopped, run, continued or aborted by writing an appropriate bit of a Global Read DMA Control register.

Memory Read TLPs

For every descriptor, the DMA Read Data Mover 202 generates a series of memory read transaction layer packets (TLPs) and transmits these memory read TLPs (read requests) to the root complex 110. The size of each read TLP should not exceed certain limits, such as the maximum payload size or the maximum read size of the HIP 150. Therefore, multiple memory read TLPs may be created for a single DMA descriptor.

In an exemplary implementation, there is no address translation for the read TLPs, and the address is used as is. In this exemplary implementation, if the high 32-bit address is non-zero, 3 DW header TLPs will be sent, otherwise, 4 DW header TLP will be generated.

In an exemplary implementation, the DMA Read Data Mover 202 may support eight tags numbered from 0-7. This tag range may be used to identify the completion TLP associated with a transmitted read TLP. For each tag, there may be an associated register to store the memory-mapped address in the local memory 140 where the payload will be written when the tag of the completion TLP is matched. The associated register may also hold the status of the read completion for each tag. The status may include a pending status bit, and the pending number of DWORDs for the tag.

When a read TLP is transmitted, an associated tag register is consumed and marked with the pending status. A destination register associated with the read TLP may also be initialized based on the destination address and how the DMA read is partitioned into multiple read TLPs. This destination register may be updated by completion processing logic.

Completion TLP

The payload of read completion TLPs that are received from the RC 110 may be written back to the read-DMA write data port based on the destination address and tag number of the read TLPs. When a completion TLP is received, the tag is decoded, and the tag register may be accessed to retrieve the address where the payload for the completion TLP will be written. When the payload is sent to the MM fabric, the pending flag and address field of the tag register is updated. The pending flag may be reset and the current tag released when the last payload of the read is received.

Descriptor Control Module

The descriptor control module (also referred to as the "descriptor controller") 130 manages the DMA read and write operations. In an exemplary implementation, separate read and write descriptor control logic are provided to facilitate concurrent read and write DMA operations. The descriptor control logic directs and causes the DMA read data mover 202 and the DMA write data mover 204 to move data between the memory 112 of the RC 110 and the local memory 140.

The descriptor control module 130 is external to the main DMA module. This enables customization of the descriptor control module 130.

Host software programs executed by the CPU 118 may program the internal register of the CPU 118 with the location and size of the descriptor table residing in the main memory 112. Using this information, logic in the descriptor control module 130 (descriptor control logic) directs the DMA read data mover 202 to copy the descriptor table 114 and place it in the local memory 140. The descriptor control logic then fetches a table entry (i.e. a descriptor from the descriptor table) and directs the DMA read and write data movers (202 and 204) to transfer the data indicated by the descriptor. The descriptor control module 130 may also send the DMA status information upstream to the CPU 118 via the TXS port.

In an exemplary implementation, the descriptor control module 130 includes the following ports: a read control interface which interfaces with the DMA read data mover 202; a write control interface (which interfaces with the DMA write data mover 204; a descriptor control master (DCM) port to communicate with the Tx slave control module 208 via TXS; a descriptor control slave (DCS) port to communicate with the Rx master control module 206 via RXM; and a descriptor table master (DTM) port which provides an interface to the local descriptor table via the corresponding descriptor table slave (DTS) port of the local memory 140.

An exemplary implementation of the read and write control interfaces are given below in Table 11. Other implementations for the read and write control interfaces may be used.

TABLE 11

Exemplary Read and Write Control Interfaces for Descriptor Controller

| Interface | Signal Name | I/O | Description |
| --- | --- | --- | --- |
| Read Control | RdDmaTxData_o[159:0] | Output | Read Descriptor Tx Control Data used to load descriptor information to the Read Data Mover |
| | RdDmaTxValid_o RdDmaTxValid_o | Output | Read Descriptor Tx Control Valid |
| | RdDmaRxReady_i | Input | Read Descriptor Control Data Ready |
| | RdDmaRxData_i[31:0] | Input | Read Descriptor Rx Control Data to receive descriptor status from the Read Data Mover |
| | RdDmaRxValid_i | Input | Read Descriptor Rx Control Valid |
| Write Control | WrDmaTxData_o[159:0] | Output | Write Descriptor Tx Control Data used to load descriptor information to the Write Data Mover |
| | WrDmaTxValid_o | Output | Write Descriptor Tx Control Valid |
| | WrDmaRxReady_o | Input | Write Descriptor Control Data Ready |
| | WrDmaRxData_i[31:0] | Input | Write Descriptor Rx Control Data to receive descriptor status from the Write Data Mover |
| | WwDmaRxValid_i | Input | Write Descriptor Rx Control Valid |

An exemplary implementation of the descriptor control master (DCM) and descriptor control slave (DCS) interfaces are given below in Table 12. Other implementations for the DCM and DCS interfaces may be used.

TABLE 12

Exemplary Descriptor Control Master and Slave Interfaces

| Interface | Signal Name | I/O | Description |
| --- | --- | --- | --- |
| Descriptor Control Master | DCMRead_o | Output | Descriptor Control Master Read Request |
| | DCMWrite_o | Output | Descriptor Control Master Write Request |
| | DCMAddress_o[63:0] | Output | Descriptor Control Master Address |
| | DCMWriteData_o[31:0] | Output | Descriptor Control Master Write Data |
| | DCMByteEnable_o[3:0] | Output | Descriptor Control Master Byte Enable |
| | DCMWaitRequest_i | Input | Descriptor Control Master Wait Request |
| | DCMReadData_i[31:0] | Input | Descriptor Control Master Read Data |

TABLE 12-continued

Exemplary Descriptor Control Master and Slave Interfaces

| Interface | Signal Name | I/O | Description |
|---|---|---|---|
| Descriptor Control Slave | DCSRead_i | Input | Descriptor Control Slave Read Request |
| | DCSWrite_i | Input | Descriptor Control Slave Write Request |
| | DCSChipSelect_i | Input | Descriptor Control Slave Chip Select |
| | DCSAddress_i[31:0] | Input | Descriptor Control Slave Address |
| | DCSReadData_o[63:0] | Output | Descriptor Control Slave Read Data |
| | DCSWriteData_i[31:0] | Input | Descriptor Control Slave Write Data |
| | DCSByteEnable_i[3:0] | Input | Descriptor Control Slave Byte Enable |
| | DCSWaitRequest_o | Output | Descriptor Control Slave Wait Request |
| | DCSReadData_o | Output | Descriptor Control Slave Read Data |

An exemplary implementation of descriptor table master interface is given below in Table 13. Other implementations for the descriptor table master interface may be used.

TABLE 13

Exemplary Descriptor Table Master Interface

| Interface | Signal Name | I/O | Description |
|---|---|---|---|
| Descriptor Table Master | DTMRead_o | output | Descriptor Control Master Read Request |
| | DTMAddress_o[63:0] | output | Descriptor Control Master Address |
| | DTMReadData_i[255:0] | Input | Descriptor Control Master Read Data |
| | DTMWaitRequest_i | Input | Descriptor Control Master Wait Request |
| | DTMReadDataValid_i | Input | Descriptor Control Master Read Data |

Exemplary register definitions for the descriptor controller are given below in Table 14. Other register definitions may be used in other implementations.

TABLE 14

Exemplary Register Definitions for Descriptor Controller

| Type | Address | Register | Access | Description |
|---|---|---|---|---|
| DMA Write Registers | 0x0000 | Write DMA Control | R/W | Contains the write Control information and the number of descriptors |
| | 0x0004 | Write Descriptor Status | R | Write DMA Status |
| | 0x0008 | RC Write Descriptor Base (Low) | R/W | Lower 32-bit Base Address of the write descriptor table in the RC memory |
| | 0x000C | RC Write Descriptor Base (High) | R/W | Upper 32-bit Base Address of the write descriptor table in the RC memory |
| | 0x0010 | Last Write Descriptor Index | R/W | Last descriptor ID to be processed |
| | 0x0014 | EP Descriptor Table Base (Low) | RW | Lower 32-bit Base Address of the write descriptor table in the EP memory |
| | 0x0018 | EP Descriptor Table Base (Low) | RW | Higher 32-bit Base Address of the write descriptor table in the EP memory |
| | 0x001C | Write DMA Performance | R | Write DMA Performance Counter. (Clock cycles from time DMA header programmed until last descriptor completes, including time to fetch descriptors.) |
| DMA Read Registers | 0x0100 | Read Descriptor Control | R/W | Contains the read Control information and the number of descriptors |
| | 0x0104 | Read DMA Status | R | Read DMA Status |
| | 0x0108 | RC Read Descriptor Base (Low) | R/W | Lower 32-bit Base Address of the read descriptor table in the RC memory |
| | 0x010C | RC Read Descriptor Base (High) | R/W | Upper 32-bit Base Address of the read descriptor table in the RC memory |
| | 0x0110 | RC LAST | R/W | Last descriptor number to be processed |
| | 0x0114 | EP Descriptor Table Base (Low) | RW | Lower 32-bit Base Address of the write descriptor table in the EP memory |
| | 0x00118 | EP Descriptor Table Base (Low) | RW | Higher 32-bit Base Address of the write descriptor table in the EP memory |
| | 0x0011C | Read DMA Performance | R | Read DMA Performance Counter. (Clock cycles from time DMA header programmed until last descriptor completes, including time to fetch descriptors.) |

An exemplary global control and status register bit mappings for the descriptor controller are given below in Tables 15 and 16. Other control and status bit mappings may be used in other implementations.

TABLE 15

Exemplary Control Register Bit Mapping for Descriptor Controller

| Bit | Field | Description |
|---|---|---|
| [7:0] | Number of Descriptors | The number of descriptor in the table stored in the RC memory. This is used to fetch the correct amount of data in the table. |
| 8 | START | DMA "go" bit, reset by internal logic |
| 9 | MSI_ENA | Enables MSI message for the DMA. When set to 1, the MSI is sent once all descriptors are completed. |
| 10 | EP_LAST_ENA | Enables the Endpoint DMA module to write descriptor ID of each descriptor back to the EPLAST field in the descriptor table. |
| 11 | PAUSE | Halting the DMA. Cleared by internal logic. |
| 12 | RESUME | Resume DMA. Cleared by internal logic. |
| 13 | ABORT | Abort the current DMA. Cleared by internal logic |
| 14 | FLUSH | Flush all DMA descriptors. Cleared by internal logic |
| 15 | LOOP | If set to 1, the controller restart from descriptor 1 after complete processing the entire table |

TABLE 16

Exemplary Status Register Bit Mapping for Descriptor Controller

| Bit | Field | Description |
|---|---|---|
| [7:0] | EP_LAST | ID of the most recent descriptor completed successfully |

An exemplary descriptor table format is given below in Table 17. In this exemplary format, the size of each descriptor (and the header) may be the same size as the DMA data width. In this particular implementation, the DMA data width and the descriptor size may both be 8 dwords, where a dword (or DWORD) is 4 bytes long. Other descriptor table formats may be used in other implementations.

TABLE 17

Exemplary Descriptor Table Format

| Address | Type | Description |
|---|---|---|
| Offset 0x00 | Header | EPLAST - when enabled by the EPLAST_ENA bit in the control register, this location records the number of the last descriptor completed |

TABLE 17-continued

Exemplary Descriptor Table Format

| Address | Type | Description |
|---|---|---|
| | | by the chaining DMA module. |
| | | Reserved |
| | | Reserved |
| | | Reserved |
| | | Reserved |
| 0x20 | Descriptor 0 | Source Address lower dword |
| 0x24 | | Source Address upper dword |
| 0x28 | | Destination Address lower dword |
| 0x2c | | Destination Address upper dword |
| 0x30 | | Control field, DMA length |
| 0x40 | Descriptor 1 | Source Address lower dword |
| 0x44 | | Source Address upper dword |
| 0x48 | | Destination Address lower dword |
| 0x4C | | Destination Address upper dword |
| 0x50 | | Control field, DMA length |
| 0x60 | Descriptor n | Source Address lower dword |
| ... | | Source Address upper dword |
| ... | | Destination Address lower dword |
| ... | | Destination Address upper dword |
| ... | | Control field, DMA length |

General Control and Status Registers

The general control and status register module 210 holds miscellaneous control and status registers inside the DMA main module 120 and is accessible by way of the CRA (control register access) port. The root complex 110 may also access the general control and status register module 210 by way of the RXM and CRA ports.

An exemplary CRA slave interface to the general control and status register module 210 is given below in Table 18. Other interfaces for the general control and status register module 210 may be used in other implementations.

TABLE 18

Exemplary CRA Slave Interface

| Interface | Signal Name | I/O | Description |
|---|---|---|---|
| Descriptor Control Slave | CraRead_i | Input | CRA Read Request |
| | CraWrite_i | Input | CRA Write Request |
| | CraAddress_i[31:0] | Input | CRA Address |
| | CraWriteData_i[31:0] | Input | CRA Read Data |
| | CraByteEnable_i[3:0] | Input | CRA Byte Enable |
| | CraWaitRequest_o | Output | CRA Wait Request |

An exemplary CRA register address mapping to the general control and status register module 210 is given below in Table 19. Other register address mappings for the general control and status register module 210 may be used in other implementations.

TABLE 19

Exemplary CRA Register Address Mapping

| Type | Address | Register | Access | Description |
|---|---|---|---|---|
| HIP Config Register | 0x0000 | PCI_CMD | R | PCI Command Register as PCI spec |
| | 0x0004 | MSI CSR/DATA | R | MSI Control and Data as PCIe Spec [15:0]:MSI Data [31:16]:MSI Control |
| | 0x0008 | MSI_ADDR_LOW | R | Lower 32-bit of MSI Address |
| | 0x000C | MSI_ADDR_HIGH | R | Higher 32-bit of MSI Address |
| | 0x0010 | MSI-X CONTROL | R | MSI-X Control as PCIe Spec |
| | 0x0014 | LINK STATUS | R | Link Status Register as PCI Spec |
| Read Data | 0x0100 | RD DMA CONTROL | R/W | Global DMA read control including error handling |

TABLE 19-continued

Exemplary CRA Register Address Mapping

| Type | Address | Register | Access | Description |
| --- | --- | --- | --- | --- |
| Mover Registers | 0x0104 | RD DMA STATUS | R | Read DMA Status |
| Write Data | 0x0200 | WR DMA CONTROL | R/W | Global DMA Write control including error handling |
| Mover Registers | 0x0204 | WR DMA STATUS | R | Write DMA Current Descriptor ID |

An exemplary control register bit mapping to the general control and status register module 210 is given below in Table 20. Other control register bit mappings for the general control and status register module 210 may be used in other implementations.

TABLE 20

Exemplary Control Register Bit Mapping

| Bit | Field | Description |
| --- | --- | --- |
| 3 | FLUSH | Flush all DMA descriptors. Cleared by internal logic |
| 2 | ABORT | Abort the current DMA. Cleared by internal logic |
| 1 | RESUME | Resume DMA. Cleared by internal logic. |
| 0 | PAUSE | Halt the DMA. Cleared by internal logic. |

Transmit Arbitrator

The transmit arbitrator module (TX Arbitrator) 212 arbitrates between multiple data streams that are to be transmitted through the TX port to the HIP module 150. Various conventional arbitration schemes may be used.

DMA Operation

Figure 3:
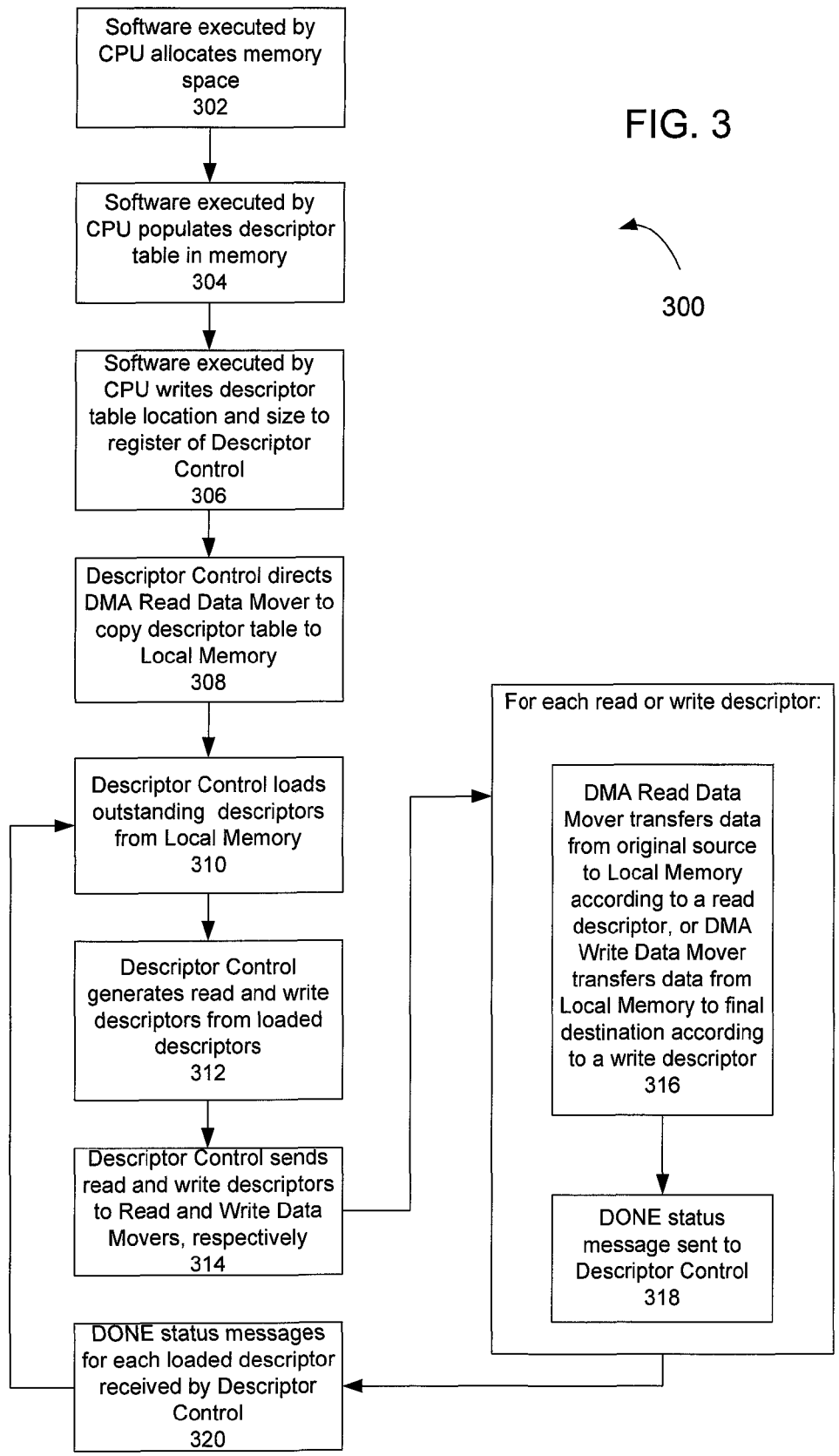
FIG. 3 is a flow chart depicting a method of performing a DMA operation in accordance with an embodiment of the invention.

FIG. 3 is a flow chart depicting an exemplary method 300 of performing a DMA operation in accordance with an embodiment of the invention. The DMA operation may be used to transfer data from a source address range to a destination address range.

The DMA operation may begin when, per block 302, software executed by the CPU 118 of the root complex 110 allocates memory space in the main memory 112. Per block 304, the software may then populate a descriptor table 114 within the allocated memory. The descriptor table 114 may include one or more descriptor entries ("descriptors" or "DMA descriptors").

Per block 306, the software may then write the location and size of the descriptor table 114 to a register of the descriptor control module 130. The descriptor control module 130 may then use this information to direct the DMA read data mover 202 to copy the descriptor table 114 to the local memory 140.

With the descriptor table 114 copied into the local memory 140, the descriptor control module 130 may then, per block 310, load one or more outstanding (i.e. not yet completed) DMA descriptors from the local memory 140. The loading of the DMA descriptors may be accomplished via the link between the master port (DTM) of the descriptor control module 130 and the slave port (DTS) of the local memory 140.

Per block 312, the descriptor control module 130 may then generate read and write descriptors from the loaded DMA descriptors. The read descriptors may each contain an original source address from a loaded DMA descriptor and an end-point (EP) destination address in local memory. The write descriptors may each contain an EP source address in local memory and a final destination address from a loaded DMA descriptor.

Per block 314, the descriptor control module 130 may then send read descriptors to the DMA read data mover 202 and write descriptors to the DMA write data mover 204. The read and write descriptors direct the DMA read and/or write data movers 202 and 204, respectively, to transfer data in accordance with the loaded DMA descriptors.

Per block 316, the DMA read data mover 202 transfers data from an original source address to an EP address in the local memory 140 according to a read descriptor, or the DMA write data mover 204 transfers data from an EP address in the local memory 140 to a final destination according to a write descriptor. Per block 318, after completion of the transfer, a DONE status message may be sent from the data mover performing the transfer to the descriptor control module 130.

Per block 320, when DONE status messages for each of the read and write descriptors derived from the loaded descriptors have been received by the descriptor control module 130, then the method 300 may loop back to block 310 and load further outstanding descriptors, if any, from the local memory 140 to the descriptor control module 130.

Benefits and Advantages

The modular architecture disclosed herein has the benefit of scalability to accommodate multiple programming models with minimal changes to RTL (register-transfer level) designs. The programming models may differ based on descriptor formats, linkage and storage locations. The programming models may also differ based on the handshaking method with the host application. The handshaking method determines when the descriptors are passed from the host application to the descriptor controller for execution and back to the host on completion.

The descriptor control module may be advantageously designed for processing multiple channels. For example, multiple streams of data may be moved in parallel by having a "channel" for each data stream. The descriptor control module may accommodate such multiple data streams by rotating through the different channels as it gives tasks to the DMA read and write data movers.

In one embodiment, there may be multiple descriptor controllers, each designed to handle a different type of DMA. For example, the multiple descriptor controllers may have different bandwidths, or different descriptor styles, or different descriptor linkages, or different handshaking. The multiple descriptor controllers may go through a master arbiter to hand requests to the DMA read and write engines.

Furthermore, the modular architecture with the DMA read and write data movers allows support for multiple functions or single-root input/output virtualization based applications. In this case, the DMA read and write data movers may be arranged to take a function number as an input with each descriptor request. The function number may be used in the transaction layer packet (TLP) requests generated.

This architecture offers a very efficient implementation when hardening the DMA system while maintaining programming flexibility. In particular, the DMA main module (including the DMA read and write data movers) may be implementing in hard-wired circuitry, while the descriptor controller may be implemented in programmable circuitry.

In addition, there is a usability benefit due to this architecture. Users may customize the DMA system by changing the descriptor controller without needing to know details of the protocol being used by the data link. This is because, while the data mover may be optimized for the data link protocol, the descriptor controller is protocol agnostic.

Furthermore, this architecture also has a testability benefit. The modularity of the architecture enables directed testing at the data mover level. Such directed testing at the data mover level may not be readily achieved in a conventional architecture.

Example FPGA

Figure 4:
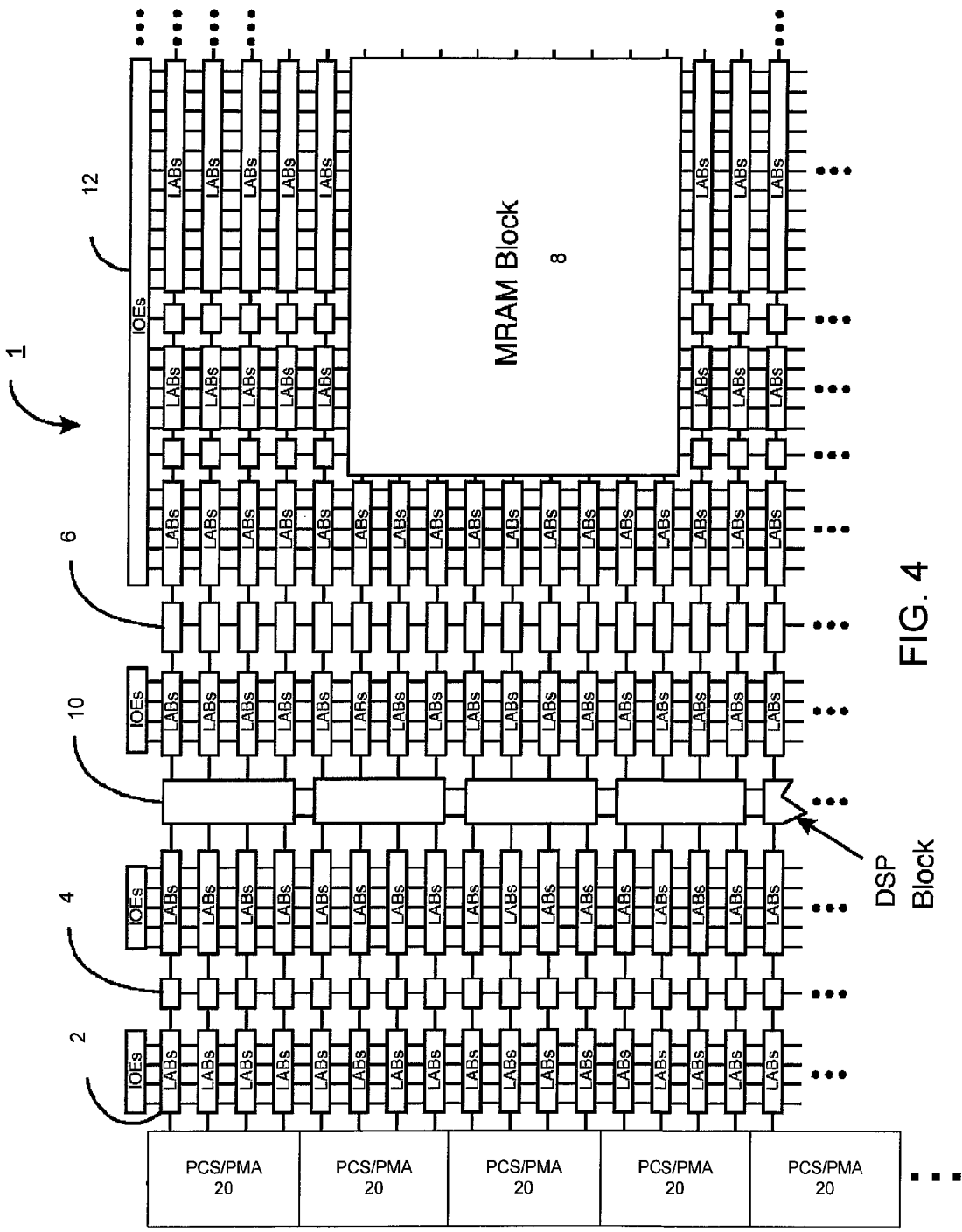
FIG. 4 is a simplified partial block diagram of a field programmable gate array (FPGA) that can include aspects of the present invention.

FIG. 4 is a simplified partial block diagram of a field programmable gate array (FPGA) 1 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 1 includes within its "core" a two-dimensional array of programmable logic array blocks (or LABs) 2 that are interconnected by a network of column and row interconnect conductors of varying length and speed. LABs 2 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 1 may also include a distributed memory structure including random access memory (RAM) blocks of varying sizes provided throughout the array. The RAM blocks include, for example, blocks 4, blocks 6, and block 8. These memory blocks can also include shift registers and FIFO buffers.

FPGA 1 may further include digital signal processing (DSP) blocks that can implement, for example, multipliers with add or subtract features. Input/output elements (IOEs) 12 located, in this example, around the periphery of the chip support numerous single-ended and differential input/output standards. Each IOE 12 is coupled to an external terminal (i.e., a pin) of FPGA 10. PMA/PCS channel circuits 20 may also be provided with each PMA/PCS channel circuit 20 being coupled to several LABs.

In one embodiment, the integrated circuit 105 for the DMA system 100 may be an FPGA. For example, the DMA main module 120 and the HIP module 150 may be implemented as a hard-wired modules, and the descriptor control module 130 may be implemented in the programmable logic fabric of the FPGA. The local memory 140 may be implemented in the memory blocks on the FPGA.

It is to be understood that FPGA 1 is described herein for illustrative purposes only and that the present invention can be implemented in many different types of PLDs, FPGAs, and ASICs.

Example Digital System

Figure 5:
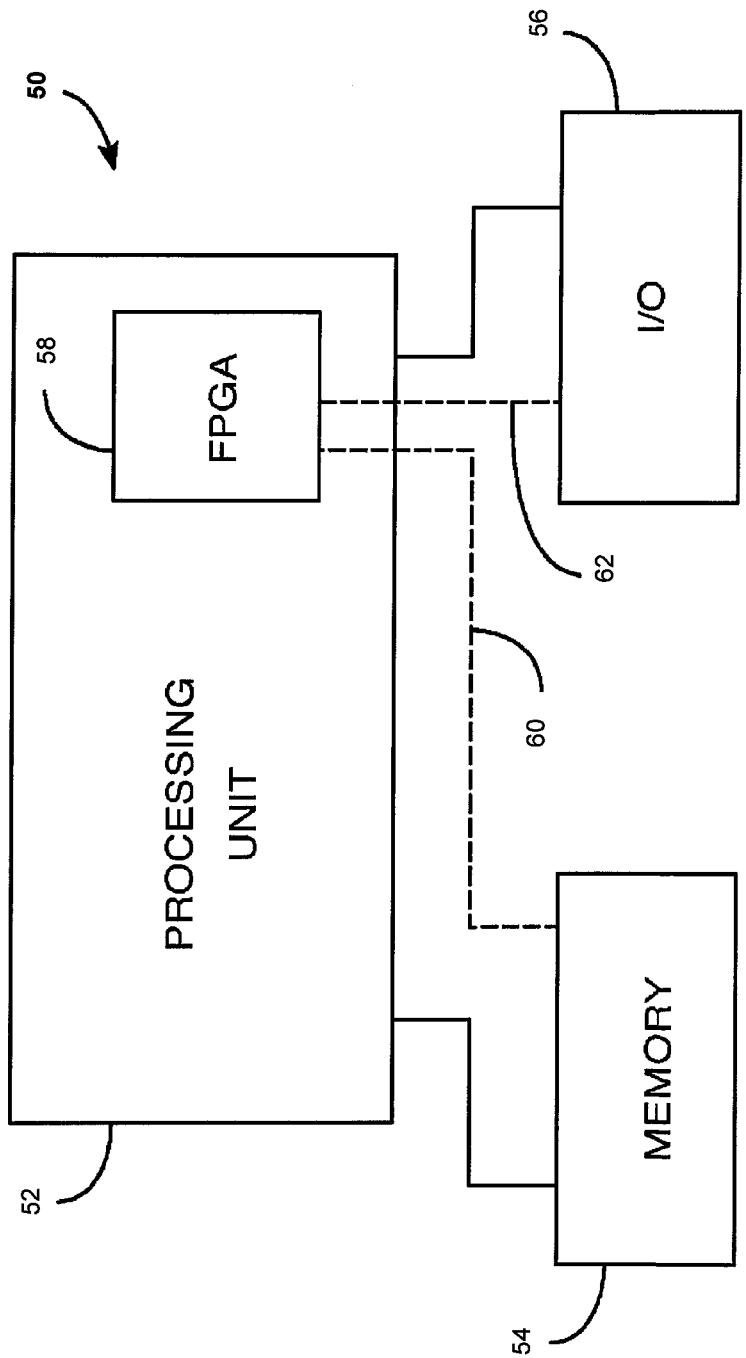
FIG. 5 is a block diagram of an exemplary digital system that can employ techniques of the present invention.

FIG. 5 shows a block diagram of an exemplary digital system 50 that can embody techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. An integrated circuit with a modular direct memory access system, the integrated circuit comprising:

a read data mover for receiving data obtained from an original source address;

a write data mover for sending the data to a final destination address; and
a descriptor controller for providing the original source address to the read data mover and the final destination address to the write data mover,
wherein the descriptor controller comprises circuitry electronically programmed to cause the read data mover to copy a descriptor table from memory of a root complex to local memory in the integrated circuit, wherein the descriptor table includes at least one descriptor, and wherein said at least one descriptor comprises an original source address, a final destination address, and a length of the data.

2. The integrated circuit of claim 1, wherein the read and write data movers are implemented in hard-wired circuitry, and wherein the descriptor controller is implemented in electronically-programmed circuitry.

3. The integrated circuit of claim 1 further comprising:
local memory;
a write data interface for writing data from the read data mover to the local memory; and
a read data interface for reading data from the local memory to the write data mover.

4. The integrated circuit of claim 1, wherein the descriptor controller comprises circuitry electronically programmed to load at least one descriptor from the local memory in the integrated circuit, generate read and write descriptors from said at least one descriptor, provide the read descriptor to the read data mover, and provide the write descriptor to the write data mover.

5. The integrated circuit of claim 4, wherein the descriptor controller further comprises circuitry electronically programmed to receive status messages from the read and write data movers.

6. An integrated circuit with a modular direct memory access system, the integrated circuit comprising:
a read data mover for receiving data obtained from an original source address;
a write data mover for sending the data to a final destination address;
a descriptor controller for providing the original source address to the read data mover and the final destination address to the write data mover;
a transmit slave interface;
a transmit interface; and
a transmit control module for receiving control messages from the descriptor controller via the transmit slave interface and transmitting the control messages to a root complex via the transmit interface.

7. The integrated circuit of claim 6 further comprising:
a transmit arbitrator for scheduling outgoing data paths from the read data mover, the write data mover, and the transmit control module, the transmit arbitrator providing an output to the transmit interface.

8. An integrated circuit with a modular direct memory access system, the integrated circuit comprising:
a read data mover for receiving data obtained from an original source address;
a write data mover for sending the data to a final destination address;
a descriptor controller for providing the original source address to the read data mover and the final destination address to the write data mover;
a receive interface;
a receive master interface; and
a receive control module for receiving control messages from a root complex via the receive interface and communicating the control messages to the descriptor controller via the receive master interface.

9. A method of providing a direct memory access (DMA) transfer using an integrated circuit, the method comprising:
obtaining a descriptor by a descriptor controller, wherein the descriptor comprises at least an original source address for the DMA transfer, a final destination address for the DMA transfer, and a data length;
reading data starting at the original source address by a read data mover;
writing the data by the read data mover to an end-point address in local memory on the integrated circuit;
reading the data from the end-point address in the local memory by a write data mover;
writing the data by the write data mover to the final destination address; and
the descriptor controller causing the read data mover to copy a descriptor table comprising a plurality of descriptors from memory of a root complex to the local memory on the integrated circuit.

10. The method of claim 9, wherein the read and write data movers are implemented in hard-wired circuitry of the integrated circuit, and wherein the descriptor controller is implemented in electronically-programmed circuitry of the integrated circuit.

11. The method of claim 9, wherein the descriptor controller comprises circuitry electronically programmed to load at least one descriptor from the local memory, generate read and write descriptors from said at least one descriptor, provide the read descriptor to the read data mover, and provide the write descriptor to the write data mover.

12. The method of claim 11, wherein the descriptor controller comprises circuitry electronically programmed to receive status messages from the read and write data movers.

13. A system for direct memory access, the system comprising:
a root complex comprising a central processing unit, main memory, and a root port communicatively connected to the main memory and the central processing unit;
a read data mover for receiving data obtained from a source address;
a write data mover for sending the data to a destination address;
at least one descriptor controller for providing the source address to the read data mover and the destination address to the write data mover;
a data link communicatively interconnecting the root complex and the read and write data movers;
local memory;
a write data interface for writing data from the read data mover to the local memory; and
a read data interface for reading data from the local memory to the write data mover,
wherein the read and write data movers are implemented in hard-wired circuitry, and wherein the descriptor controller is implemented in electronically-programmed circuitry,
wherein the descriptor controller comprises circuitry electronically programmed to cause the read data mover to copy a descriptor table from memory of the root complex to the local memory, wherein the descriptor table includes at least one descriptor, and wherein said at least one descriptor comprises a source address, a destination address, and a length of the data.

14. The system of claim 13, wherein the descriptor controller comprises circuitry electronically programmed to load at least one descriptor from the local memory and direct the read and write data movers to transfer data according to said at least one descriptor, and wherein said at least one descriptor comprises a source address, a destination address, and a length of the data.

15. The system of claim 14, wherein the descriptor controller further comprises circuitry electronically programmed to receive status messages from the read and write data movers.

16. The system of claim 13, wherein the system is in a single packaged device.

17. A system for direct memory access, the system comprising:
- a root complex comprising a central processing unit, main memory, and a root port communicatively connected to the main memory and the central processing unit;
- a read data mover for receiving data obtained from a source address;
- a write data mover for sending the data to a destination address;
- at least one descriptor controller for providing the source address to the read data mover and the destination address to the write data mover;
- a data link communicatively interconnecting the root complex and the read and write data movers;
- a transmit slave interface;
- a transmit interface; and
- a transmit control module for receiving control messages from the descriptor controller via the transmit slave interface and transmitting the control messages to the root complex via the transmit interface.

18. The system of claim 17 further comprising:
- a transmit arbitrator for scheduling outgoing data paths from the read data mover, the write data mover, and the transmit control module, the transmit arbitrator providing an output to the transmit interface.

19. The system of claim 17, wherein the system is in a single packaged device.

20. A system for direct memory access, the system comprising:
- a root complex comprising a central processing unit, main memory, and a root port communicatively connected to the main memory and the central processing unit;
- a read data mover for receiving data obtained from a source address;
- a write data mover for sending the data to a destination address;
- at least one descriptor controller for providing the source address to the read data mover and the destination address to the write data mover;
- a data link communicatively interconnecting the root complex and the read and write data movers;
- a receive interface;
- a receive master interface; and
- a receive control module for receiving control messages from the root complex via the receive interface and communicating the control messages to the descriptor controller via the receive master interface.

21. The system of claim 20, wherein the system is in a single packaged device.

* * * * *